United States Patent [19]

Lindl et al.

[11] 4,071,635

[45] Jan. 31, 1978

[54] MIXES AND PROCESSES FOR PREPARING MEAT PRODUCTS

[75] Inventors: Willibald M. Lindl, Minneapolis; James R. Klande, Crystal; Glenn J. VanHulle, Brooklyn Park, all of Minn.

[73] Assignee: General Mills, Inc., Minneapolis, Minn.

[21] Appl. No.: 647,942

[22] Filed: Jan. 12, 1976

[51] Int. Cl.² .............................................. A23L 1/31
[52] U.S. Cl. .................................. 426/264; 426/646; 426/652; 426/656; 426/657; 426/802
[58] Field of Search ............... 426/264, 266, 554, 555, 426/646, 652, 656, 802, 661, 657

[56] References Cited

U.S. PATENT DOCUMENTS

| | | | |
|---|---|---|---|
| 3,840,679 | 10/1974 | Liepa et al. | 426/802 X |
| 3,873,740 | 3/1975 | Terrell | 426/646 |
| 3,900,576 | 8/1975 | Schulz | 426/656 X |
| 3,911,157 | 10/1975 | Bates et al. | 426/802 X |
| 3,943,263 | 3/1976 | Sato et al. | 426/266 X |
| 3,952,111 | 4/1976 | Desrosier | 426/802 X |

FOREIGN PATENT DOCUMENTS

| | | | |
|---|---|---|---|
| 1,161,115 | 1/1964 | Germany | 426/646 |

*Primary Examiner*—Raymond N. Jones
*Assistant Examiner*—Esther M. Kepplinger
*Attorney, Agent, or Firm*—Gene O. Enockson

[57] ABSTRACT

Dry mixes for use with ground meat and water to provide products in the nature of lunchmeat specialities. The dry mix compositions include starch or a starch source material, a two component protein ingredient, a meat curing agent, an alkaline phosphate salt and sodium chloride. Processes for preparing products from the dry mixes.

18 Claims, No Drawings

MIXES AND PROCESSES FOR PREPARING MEAT PRODUCTS

The present invention relates to new compositions useful in the preparation of meat products, such products being in the nature of lunchmeats. More particularly, it relates to dry particulate mixtures of defined ingredients which can be combined with water and ground meat to yield the meat products. The invention also relates to the processes of preparing the meat products.

The so-called "lunchmeat" market is very large in the U.S. with retail sales in excess of a billion dollars annually. These packaged, ready-to-eat meat specialties, such as bologna, salami and the like provide time saving convenience for any number of consumers. However, such speciality products have been, and continue to be, relatively expensive on a per pound basis versus uncooked meats such as ground beef. Further, there is a growing awareness of the raw materials which go into their commercial preparation. Generally, the meat portions thereof are the less delectable (but edible) parts of animals such as navels, jowls and the like. Also, the products normally have a relatively high fat content in comparison to lean beef, for example. Thus absent the convenience factor it is doubtful whether these commercially available specialty meat products should be able to command the high per pound price that they now do.

We have discovered compositions and processes which can be used to provide high quality cooked meat products of the nature of the commercially available lunchmeat specialties at a potential significant cost saving for the ultimate user. Our invention is directed especially at compositions and processes which can be used in the home to yield the said cooked meat products from readily available ground meats, such as ground beef or hamburger. The processes can be easily carried out by today's homemaker using simple mixing operations, standard kitchen equipment and home ovens. From start to finish, the cooked meat products are ready for consumption within approximately two hours. They also have extended stability when refrigerated and, thus after preparation, provide essentially the same convenience factors as the commercially available packaged, ready-to-eat meat specialties. The products prepared in accordance with our invention are preferably made, as indicated above, from wholesome cuts of fresh ground meat thus providing the homemaker with confidence as to the nutritional characteristics of the products. In this latter respect and under optimum formulations and conditions, two pounds of cooked meat product are obtained from each pound of starting ground meat. Thus the fat content is approximately one half of that of the starting raw meat which is considerably less than most of the aforementioned commericially available luncheon meat specialties.

In respect of commercial manufacturing operations, our compositions and processes allow the manufacturer to produce meat specialties without the need for the normally required casings for such products as bologna and salami.

The compositions of our invention comprise essentially a starch or starch source material, a protein component made up at least in part of egg albumin, a meat curing agent, an alkaline phosphate salt and ordinary salt. The compositions optionally but desirably may also contain acidulents, seasonings, flavorings, coloring agents, stabilizers, oils and the like. These compositions are then used with ground meats and water in the processes yielding the cooking meat products.

The starch or starch source material component is needed as a fat and water binder. At the same time it contributes to the texture of the prepared cooked meat product and also aids in decreasing cooking loss. Additionally, it serves as a relatively low cost filler thus assisting in the objective of providing a packaged system which can potentially reduce the cost of the cooked meat products in comparison to the commercially available meat specialties. Starches such as corn, wheat and tapioca starches are preferred and these may be in modified form such as are commercially available. Modified corn starch is a preferred ingredient with tapico starch also giving optimum results. Various flours are also useful as the starch source material, i.e. wheat and oat flour. However, while good textural properties in the cooked meat products are achieved with flours and other than the preferred starches, off-flavors were found to be contributed thereby and thus the same are desirably not used as the sole starch or starch source material.

The protein component generally contributes texture to the cooked meat product by increasing bits and chewability (the starch or starch source material in the total system tends to reduce bite and chewability and thus optimally balances these characteristics in conjunction with the protein component). This texture contribution may well be due to the capability of the protein component to bind the meat particles into an acceptable matrix during the curing-cooking stage. Of course, the protein component aids in the production of the cooked meat product having good nutritional characteristics by providing necessary protein.

As indicated, at least a part of the protein component is egg albumin. In the package dry mix formulations, all ingredients will be dry and the egg albumin will be in the form of dehydrated egg whites which are commercially available from many sources. A variety of materials can be used to make up the remainder of the protein component—i.e. animal and vegetable proteins such as sodium caseinate, whey, vital gluten, oilseed proteins such as flours, concentrates and isolates. Optimally, we have found that soy isolate is the preferred such component due to its high protein content and bland taste characteristics. Other of the available protein materials tended to give cooked meat products that had less than optimum texture or off-flavor or required greater quantities of water during processing. While egg albumin is a fairly expensive ingredient, the remaining protein ingredient is lower in cost while still contributing to improved bite and chewability characteristics of the cooked meat product. In addition, the same is believed to aid in fat and water binding and decreasing cooking loss.

The meat curing agent is used to provide the cooked meat products with the color characteristics of the commercially available meat specialties. In the absence thereof, the products would have the color of well done roast beef, for example. It also makes a flavor contribution. The edible curing agents are those conventionally used in meat specialties production. These generally provide nitric oxide during the curing of the meat product such as the cooking operation. The active component is preferably a nitrogen containing salt, the most common of which is sodium nitrile. In its commercially available forms, the said salt is sold in combination with sodium chloride and also optionally sodium nitrate. Sodium erythrobate also acts as a curing agent and, when used with the nitrile, acts as a color stabilizer.

An alkaline phosphate salt is used principally to enhance the mixability of the other ingredients with the water and meat portions in the preparation of the cooked meat products. This action may well be due to a solubilizing effect on the protein of the meat portion. Due to this solubilizing action, the texture of the cooked meat product is also affected favorably, probably through increased binding of the meat particles by the solubilized protein. Of the alkaline phosphate salts such as disodium orthophosphate, sodium tripolyphosphate and tetrasodium pyrophosphate, the latter is preferred.

Sodium chloride is also included in our compositions. It not only contributes flavor to the ultimately prepared cooked meat products but also contributes further balance to the texture thereof with some stability enhancement.

A number of other ingredients can also be optionally included in our compositions. Acidulents are included to reduce the pH of the meat products to the extent desired for the particular flavor note needed. Thus where the cooked meat product is to be of the nature of salami, a more acid flavor is desired than for bologna. Also, the acid may accelerate the curing action of the curing agent. Further, the presence of acidulents to lower the pH of the meat products may improve cure color and color and shelf-life stability. A wide variety of acidulents can be used including, for example, alkali metal acid pyrophosphates (i.e. sodium acid pyrophosphate), citric acid, ascorbic acid, lactic acid, sorbic acid, erythorbic acid and their water soluble salts and glucona delta lactone.

Other optional ingredients include conventional flavorings, seasonings and coloring agents. An oil such as a vegetable oil is desirably used in our dry mix formulations to reduce dusting and enhance the incorporation of the dry mix into the water and meat portions. The oil also contributes to the mouthfeel of the finished cooked meat product.

The process of the invention involves the combining of the above requisite dry ingredient formulations with water and ground meat and then cooking of the resulting mixtures. The mixing can be carried out in one step but is preferably carried out in two stages. Only hand mixing such as with a fork, spoon or spatula is required although mechanical mixers can be used. In the two stage process, a combination of the curing agent and alkaline phosphate salt and optionally the salt is added to the ground meat with a portion of the water and then this composition is premixed. This allows the curing agent and the alkaline phosphate salt to begin action on the ground meat and usually mixing is continued until the composition thickens somewhat. Sodium erythrobate, if used, may be desirably included in this first mixing stage to accelerate color development and also to stabilize the color. Subsequent to the first mixing stage, the remainder of the dry ingredients are added along with the remainder of the water needed to rehydrate the dry ingredients. The principal dry ingredients added in the second stage are the starch or starch source material, the protein component and the salt if not added in the first stage. Optional ingredients desirably added in the second stage include the flavoring, coloring and/or seasoning agents, acidulent and oil (although a part or all of these could be added in the first mixing stage). Mixing is carried out until the composite composition is essentially free from lumps. The mixture is then cooked such as by baking to yield the cooked meat product. After cooling, the product can be sliced and has texture and coloring approximating the texture and color of commercially availabe meat specialties. A one step mixing process yields a slightly softer product than the two stage mixing procedure.

Our invention includes both one and two package mixes depending on the mixing process to be used or recommended. As such, one package would contain the curing agent, the alkaline phosphate salt and preferably the salt and the second pacakge would contain the starch or starch source material and the protein component. The optional ingredients are then desirably included in the second package although all or part of the same may be included in the first package as above indicated. The two package system is the currently preferred form of the invention.

Water is used in the process or processes of the invention in an amount sufficient to rehydrate the dry ingredients to the extent desired. Generally water will be used in an amount of about 1.5 to 4 times the weight of the dry ingredients with approximately 1.75 to 3.00 times being preferred. This then yields an overall mixture when combined with the ground meat and cooked which approximates the moisture content of the commercially available meat specialties. In the two stage process, the water is desirably added in approximately equal amounts in the two mixing operations.

The invention has particular utility with ground beef. However, other ground meats can be used such as turkey, chicken, pork and the like. Ground fish and shrimp were found to give marginally acceptable products basis the standard established for the ground beef based products. It is noted that "meat" has been used in the description as generic for the flesh and/or organs of mammals, fowl, fish and seafood.

In its preferred aspects, the present invention provides the homemaker with the benefit of obtaining two pounds of cooked meat product when starting with one pound of ground meat. Thus our especially preferred formulations reduce cooking loss to a minimal amount and the water-packaged dry mix combination and ground meat each provide one pound of weight to the cooked meat product. Our packaged mixes and processes are not limited, however, to this degree of extension. Rather, the ratio of ground meat to the dry mix-water combination can be within the range of 1:0.25 to 1:2.5.

There is nothing critical about the cooking operation in our processes and baking is preferred. The baking pans are covered or placed in a water bath to minimize cooking loss and the meat mixtures are baked at temperatures and for times sufficient to yield the cooked meat products.

The mix compositions of our invention preferably comprise the following ingredients in the indicated approximate ranges of amounts as follows:

| | % by Weight |
|---|---|
| Starch or starch source material | 25 to 85 |
| Protein Component wherein the weight ratio of egg albumin to second protein is in the range of 48:1 to 1:48 | 1.5 to 55 |
| Meat curing agent | 0.10 to 3.0 |
| Alkaline phosphate salt. | 0.1 to 15.0 |

-continued

|  | % by Weight |
|---|---|
| Sodium chloride | 1.0 to 25.0 |
| Vegetable oil | 0 to 15.0 |
| Acidulent | 0 to 10.0 |
| Flavorings, seasonings and coloring agents | 0 to 25.0 |

Especially preferred ranges for the essential components are as follows:

|  | % by Weight |
|---|---|
| Starch or starch source material | 30 to 70 |
| Protein Component wherein the weight ratio of egg albumin to second protein is in the range of 4:1 to 1:4 | 10 to 35 |
| Meat curing agent | 0.30 to 2.0 |
| Alkaline phosphate salt | 0.40 to 6.0 |
| Sodium chloride | 5.0 to 20.0 |

And as indicated, tapioca and modified corn starch, soy isolate, sodium nitrite, and tetrasodium pyrophosphate are the preferred ingredients not otherwise specifically identified above.

The following examples servE to illustrate the invention including the development of currently optimum formulations and processes. All percentages are by weight.

EXAMPLE I

A two part mix was prepared from the following ingredients:

Table 1

| Part 1 | Grams | % of Total Mix |
|---|---|---|
| Modified corn starch[1] | 110.00 | 59.668 |
| Soy isolate[2] | 22.00 | 11.934 |
| Egg albumin (dehydrated egg whites) | 22.00 | 11.934 |
| Part 2 |  |  |
| Sodium chloride | 17.00 | 9.222 |
| Seasoning[3] | 7.50 | 4.068 |
| Sodium pyrophosphate[4] | 4.50 | 2.441 |
| Sodium erythrobate | 0.25 | 0.136 |
| Curing agent mixture[5] | 1.10 | 0.597 |

[1]Col-Flo<sup>R</sup> 67 available from National Starch and Chemical Corporation. This powdered starch is white and has a moisture content of approximately 11% and a pH of approximately 6.
[2]Promine F available from Central Soya Company, Inc. The soy isolate had a protein content of approximately 95% and was bland to the taste.
[3]GT-18 available from Griffith Laboratories. This seasoning consisted of dextrose, spice extracts and spices.
[4]Tetrasodium pyrophosphate, hereafter simply "Sodium pyrophosphate".
[5]Prague Powder - composed of 6.25% sodium nitrate and 93.75% sodium chloride.

The above two part mix was used in the following manner with 1.5 cups cold water (340.00 gm.) and 450 gm. ground beef (27% fat). The hamburger was placed in a large mixing bowl and broken into small pieces. Part 2 of the dry mix was sprinkled over the meat and ¾ cup of cold water poured over the added part of the mix and the meat. This was then mixed with a plastic scraper much like one mixes a cake batter for about two minutes (circular mixing motion). The resulting mixture was pushed to the outside of the bowl with the formation of a well in the middle. Three quarters cup water was added and then Part 1 of the dry mix was added and mixed with the water until a paste was formed (about one minute). The two parts were then mixed together for about one minute with a plastic scraper using a circular mixing motion while occasionally scraping the sides of the bowl. The mixture was placed in a bread pan previously sprayed with an anti-sticking agent and was cooked in a water bath for 1.5 hours at 425° F. Prior to cooking, the mixture weighed 962.0 gm. and the cooked product weighed 950 gm. Thus the weight loss was only 12.0 gm. or 1.25%. (In a similar run but without the water bath, the weight loss was 90.0 gm. or 9.35%, but such loss could be minimized by cooking at a lower temperature). The product had very good texture and color, being much like commercially available bologna products.

EXAMPLE II

Example I was essentially repeated except that acidulents were added to Part 1 of the mix in the following amounts: Run 1 — 2.25 gm. sodium acid pyrophosphate; Run 2 — 4.50 gm. sodium acid pyrophosphate; and Run 3 — 4.50 gm. glucona delta lactone. Of these, Run 2 was the best, followed by Runs 1 (cooked product had a pH of 6.0 compared to 5.79 for Run 2) and 3 (pH of 5.24 but product had a somewhat soft, dry crumbly texture). Repeating of Run 1 but without the alkaline phosphate (i.e. tetrasodium pyrophosphate) produced a cooked product considered too soft in texture.

EXAMPLE III

Example I was essentially repeated except that thuringer, salami and bologna type products were prepared using various seasonings and flavoring systems. The two part dry mixes were made up as set forth in the following Table 2 (used with 454.0 gm. of ground beef and 1 ½ cup water):

Table 2

|  | Grams of Ingredients in | | |
|---|---|---|---|
| Part 1 | Thuringer | Salami | Bologna |
| Modified corn starch[1] | 110.00 | 110.00 | 110.00 |
| Egg albumin | 22.00 | 22.00 | 22.00 |
| Soy isolate[1] | 22.00 | 22.00 | 22.00 |
| Sodium acid pyrophosphate | 6.60 | 6.60 | — |
| Part 2 | | | |
| Sodium chloride | 19.00 | 17.00 | 23.00 |
| Seasoning | 10.00[(1)] | 8.00[(2)] | 14.72[(3)] |
| Sodium pyro-phosphate | 4.50 | 4.50 | 4.50 |
| Sodium erythrobate | 0.25 | 0.25 | 0.25 |
| Curing agent mixture[(1)] | 1.10 | 1.10 | 1.10 |
| Beef and pork flavorings (natural) | 6.12 | 6.12 | 3.40 |
| Natural hickory smoke flavor | 2.55 | 2.55 | 0.50 |

[(1)]As in Example I
[(2)]#7305 available from Stange. The seasoning had the following composition:

|  | % |
|---|---|
| Cracked black pepper | 45.00 |
| Ground white pepper | 20.00 |
| Pepper rich sugar | 17.00 |
| Dextrose | 11.94 |
| Garlic powder | 6.00 |
| Oil of anise | .06 |

[(3)]Stange 61760 having the following composition (in weight %):

|  | % |
|---|---|
| Dextrose | 49.00 |
| Corn syrup solids | 37.00 |
| Salt | 4.90 |
| Hydrolyzed vegetable protein | 4.90 |
| Monosodium glutamate | 2.60 |
| Sodium erythrobate | 0.90 |
| Natural flavors (other spices) | 0.33 |
| Extract of paprika | 0.20 |
| Garlic powder | 0.17 |

The cooked meat products resulting from the above dry mixes had good texture and flavors as indicated.

EXAMPLE IV

The thuringer flavored run of Example III was essentially repeated except that 40.0 gm. of corn oil was incorporated into Part 1 of the dry mix. The resulting cooked product had good texture and flavor and improved succulence—i.e. slices thereof had a more moist or oily surface.

EXAMPLE V

The bologna flavored run of Example III was essentially repeated except that the levels of various of the ingredients and water were changed as indicated in the following Table 3:

Table 3

| Run | Na Pyroph-osphate | Salt | Starch | Egg Albumin | Soy Isolate | Water Addition (grams) 1st | 2nd |
|---|---|---|---|---|---|---|---|
| 1 | 1 | 13 | 80 | 12 | 12 | 140 | 140 |
| 2 | 8 | 13 | 80 | 12 | 32 | 200 | 140 |
| 3 | 1 | 23 | 80 | 12 | 32 | 140 | 200 |
| 4 | 8 | 23 | 80 | 12 | 12 | 200 | 200 |
| 5 | 1 | 13 | 140 | 12 | 12 | 200 | 200 |
| 6 | 8 | 13 | 140 | 12 | 32 | 140 | 200 |
| 7 | 1 | 23 | 140 | 12 | 32 | 200 | 140 |
| 8 | 8 | 23 | 140 | 12 | 12 | 140 | 140 |
| 9 | 1 | 13 | 80 | 32 | 32 | 200 | 200 |
| 10 | 8 | 13 | 80 | 32 | 12 | 140 | 200 |
| 11 | 1 | 23 | 80 | 32 | 12 | 200 | 140 |
| 12 | 8 | 23 | 80 | 32 | 32 | 140 | 140 |
| 13 | 1 | 13 | 140 | 32 | 32 | 140 | 140 |
| 14 | 8 | 13 | 140 | 32 | 12 | 200 | 140 |
| 15 | 1 | 23 | 140 | 32 | 12 | 140 | 200 |
| 16 | 8 | 23 | 140 | 32 | 32 | 200 | 200 |
| 17 | 4.5 | 23 | 110 | 22 | 22 | 170 | 170 |
| 18 | 4.5 | 23 | 110 | 22 | 22 | 170 | 170 |

The texture of the cooked products were rated by a panel of testers in this statistically designed experiment. Rating by the panel was divided into three parts: (1) initial bite (softhard), (2) mouthfeel (soft-chewy) and (3) mouthfeel (gummy-clean). A 0–10 scale was used, 0 being soft and gummy and 10 being hard, chewy and clean. Ratings of 7 were set for Run 18 as the control. Penetrometer and shear press measurements (in pounds) were also made on each product sample. Results (averages) are set forth in the following Table 4 for runs 1–17 of Table 3:

Table 4

| Run | Initial Bite | Soft -Chewy | Gummy -Clean | Penetro-meter | Shear Press |
|---|---|---|---|---|---|
| 1 | 5.7 | 5.9 | 6.7 | 122 | 14,100 |
| 2 | 6.6 | 6.7 | 7.1 | 118 | 14,150 |
| 3 | 6.8 | 6.6 | 6.9 | 121 | 13,850 |
| 4 | 4.9 | 4.4 | 5.8 | 156 | 10,900 |
| 5 | 4.5 | 3.9 | 4.2 | 145 | 12,500 |
| 6 | 6.8 | 6.4 | 6.4 | 110 | 19,600 |
| 7 | 7.2 | 7.1 | 6.9 | 111 | 18,850 |
| 8 | 7.4 | 7.4 | 6.4 | 114 | 18,650 |
| 9 | 5.8 | 5.6 | 5.4 | 130 | 13,500 |
| 10 | 6.5 | 6.1 | 6.5 | 127 | 12,100 |
| 11 | 6.1 | 5.8 | 6.3 | 119 | 13,500 |
| 12 | 7.9 | 7.7 | 7.3 | 96 | 22,200 |
| 13 | 7.8 | 8.0 | 6.9 | 84 | 28,050 |
| 14 | 6.8 | 6.6 | 6.1 | 109 | 19,000 |
| 15 | 6.7 | 6.2 | 5.9 | 109 | 18,400 |
| 16 | 6.8 | 6.6 | 5.6 | 111 | 20,600 |
| 17 | 7.7 | 7.2 | 7.3 | 107 | 17,250 |

The above data show variations in texture with variations in ingredient levels. All of the cooked meat products of this Example were considered acceptable in texture.

EXAMPLE VI

Example V was essentially repeated with further ingredient variations as set forth in the following Table 5:

Table 3

| Run | Na Pyroph-osphate | Salt | Starch | Egg Albumin | Soy Isolate | Water Addition (grams) 1st | 2nd |
|---|---|---|---|---|---|---|---|
| 1 | 0.25 | 3 | 50 | 2 | 2 | 110 | 110 |
| 2 | 13.5 | 3 | 50 | 2 | 42 | 230 | 110 |
| 3 | 0.25 | 23 | 50 | 2 | 42 | 110 | 230 |
| 4 | 13.5 | 23 | 50 | 2 | 2 | 230 | 230 |
| 5 | 0.25 | 3 | 170 | 2 | 2 | 230 | 230 |
| 6 | 13.5 | 3 | 170 | 2 | 42 | 110 | 230 |
| 7 | 0.25 | 23 | 170 | 2 | 42 | 230 | 110 |
| 8 | 13.5 | 23 | 170 | 2 | 2 | 110 | 110 |
| 9 | 0.25 | 3 | 50 | 42 | 42 | 230 | 230 |
| 10 | 13.5 | 3 | 50 | 42 | 2 | 110 | 230 |
| 11 | 0.25 | 23 | 50 | 42 | 2 | 230 | 110 |
| 12 | 13.5 | 23 | 50 | 42 | 42 | 110 | 110 |
| 13 | 0.25 | 3 | 170 | 42 | 42 | 110 | 110 |
| 14 | 13.5 | 3 | 170 | 42 | 2 | 230 | 110 |
| 15 | 0.25 | 23 | 170 | 42 | 2 | 110 | 230 |
| 16 | 13.5 | 23 | 170 | 22 | 42 | 230 | 230 |
| 17 | 4.5 | 23 | 110 | 22 | 22 | 170 | 170 |

Results were as follows:

Table 6

| Run | Initial Bite | Soft -Chewy | Gummy -Clean | Penetro-meter | Shear Press |
|---|---|---|---|---|---|
| 1 | 2.7 | 2.7 | 5.1 | 153 | 6,850 |
| 2 | 5.9 | 5.8 | 7.6 | 151 | 10,700 |
| 3 | 6.9 | 6.5 | 7.6 | 135 | 11,750 |
| 4 | 1.8 | .71 | 7.8 | 202 | 4,800 |
| 5 | .81 | .71 | 1.0 | 170 | 8,400 |
| 6 | 7.3 | 7.4 | 5.9 | 113 | 18,650 |
| 7 | 7.6 | 7.3 | 6.4 | 111 | 18,650 |
| 8 | 7.9 | 7.9 | 7.7 | 109 | 22,450 |
| 9 | 2.6 | 2.9 | 3.3 | 170 | 7,500 |
| 10 | 5.9 | 5.6 | 5.7 | 136 | 11,900 |
| 11 | 5.5 | 5.4 | 6.1 | 136 | 12,700 |
| 12 | 8.9 | 8.7 | 6.3 | 83 | 27,050 |
| 13 | 8.0 | 6.7 | 3.7 | 76 | 36,250 |
| 14 | 6.9 | 6.4 | 5.3 | 103 | 22,650 |
| 15 | 6.9 | 6.8 | 4.9 | 97 | 19,900 |
| 16 | 8.0 | 6.9 | 5.9 | 102 | 18,600 |
| 17 | 6.7 | 7.0 | 6.9 | 111 | 16,650 |

The above data show textural acceptability for all runs except 4 and 5 (too low a level of starch-protein component when used with the amount of water indicated). On this rating system, commercially available big bologna (Oscar Mayer) rated 4 (initial bite), 3 (chewability) and 7 (mouthfeel) whereas commercially available harder sausages like salami rated 7, 7 and 8, respectively. In view thereof and the other Examples, a bologna dry mix formulation was prepared as follows:

Table 7[1]

| Part 1 | Grams | % of Total Mix |
|---|---|---|
| Modified corn starch | 43.03 | 33.293 |
| Egg albumin | 18.97 | 14.677 |
| Soy isolate | 17.78 | 13.756 |
| Corn oil | 2.00 | 1.547 |
| Seasoning[2] | 14.72 | 11.389 |
| Beef and pork flavors (natural) | 3.40 | 2.630 |
| Natural hickory Smoke flavor | 0.50 | 0.387 |
| Part 2 | | |
| Sodium pyrophospate | 4.50 | 3.482 |
| Sodium chloride | 23.00 | 17.795 |
| Sodium erythrobate | 0.25 | 0.193 |
| Curing agent mixture | 1.10 | 0.851 |

[1] Ingredients as previously used.
[2] Seasoning was Stange 61760.

When used with 454.0 gm. ground beef and 368.55 gm. water (170 1st addition, 198.55 2nd addition), this dry mix yielded a cooked product having good flavor and textural ratings of 4 (initial bite), 4 (soft-chewy) and 7 (gummy-clean), thus closely resembling the commercially available bologna.

Correspondingly, a salami dry mix formulation was prepared as follows:

Table 8[1]

| Part 1 | Grams | % of Total Mix |
|---|---|---|
| Modified corn starch | 62.18 | 37.900 |
| Egg albumin | 21.20 | 12.921 |
| Soy isolate | 33.47 | 20.400 |
| Corn oil | 3.00 | 1.828 |
| Sodium acid pyrophosphate | 6.60 | 4.023 |
| Seasoning (Stange #7305) | 6.00 | 3.657 |
| Garlic powder | 0.15 | 0.091 |
| Beef and pork flavorings (natural) | 6.12 | 3.730 |
| Natural hickory smoke flavor | 2.50 | 1.524 |
| Part 2 | | |
| Sodium chloride | 17.00 | 10.361 |
| Sodium pyrophosphate | 4.50 | 2.743 |
| Sodium erythrobate | 0.25 | 0.152 |
| Curing agent mixture | 1.10 | 0.670 |

[1]Ingredients as previously used except the identified garlic powder.

When used with 454.4 gm. of ground beef and 340.0 gm. of water, this dry mix yielded a cooked product having good flavor and textural ratings of 7 (initial bite), 7 (soft-chewy) and 7 (gummy-clean), thus also closely resembling the commercially available salami. The preferred mixing-cooking procedure for the salami product is as follows:

Crumble: one pound of ground beef into a large bowl. Sprinkle part 2 over the beef. Add ¾ cup of water.

Beat: thoroughly with a fork for 3 minutes (200 strokes) until mixture thickens.

Pour: Part 1 on top of mixture and add ¾ cup of water. Beat with fork or spoon for two minutes (until mixture is free from lumps).

Pour: mixture into a greased one-pound loaf pan (i.e. 8½ inch × 4½ inch × 2½ inch).

Cover: top of pan tightly with aluminum foil.

Bake: for 1½ hours at 350° F. Cool on a wire rack. Then slice and serve or freeze or store covered in a refrigerator.

EXAMPLE VII

The bologna dry mix formulation of Table VII of Example VI was used as the control for a further series of runs (with 454 grams ground beef). In these series of runs with panel ratings, the dry mix formulations and procedures were varied as follows (other ingredients held constant at 47.47 grams):

| Sample | |
|---|---|
| 1 | No change - control |
| 2 | No change in formula but all ingredients mixed at one time |
| 3 | Curing agent mixture omitted |
| 4 | Egg albumin and soy isolate omitted, modified corn starch increased |
| 5 | Modified corn starch and soy isolate omitted, egg albumin increased |
| 6 | Modified corn starch and egg albumin omitted, soy isolate increased |
| 7 | Egg albumin omitted, modified corn starch and soy isolate increased |
| 8 | Modified corn starch omitted, egg albumin and soy isolate increased |
| 9 | Soy isolate omitted, modified corn starch and egg albumin increased |

Table 9-A

| | Series A - Formulation Variations | | | | | | |
|---|---|---|---|---|---|---|---|
| Sample | Modified Corn starch | Egg Albumin | Soy Isolate | Water Addition 1st | 2nd | Total Water | Total Ingredients Including Meat |
| 1 (control) | 43.03 | 18.97 | 17.78 | 170.1 | 198.5 | 368.6 | 950 |
| 2 | 43.03 | 18.97 | 17.78 | 170.1 | 198.5 | 368.6 | 950 |
| 3 | 43.03 | 18.97 | 17.78 | 170.1 | 198.5 | 368.6 | 950 |
| 4 | 95.52 | — | — | 222.9 | 131.7 | 354.6 | 952 |
| 5 | — | 92.94 | — | 228.1 | 128.6 | 356.7 | 951 |
| 6 | — | — | 61.76 | 193.1 | 194.2 | 387.3 | 951 |
| 7 | 53.93 | — | 27.99 | 253.8 | 112.8 | 366.6 | 950 |
| 8 | — | 34.00 | 32.98 | 200.6 | 181.0 | 381.6 | 950 |
| 9 | 56.45 | 30.34 | — | 242.1 | 119.6 | 361.7 | 950 |

Table 9-B

| | Series A - Results | | | | |
|---|---|---|---|---|---|
| Sample | Initial Bite | Chewability | Mouthfeel | Flavor | Other Comments |
| 1 (control) | 4.0 | 4.0 | 7.0 | 7.0 | |
| 2 | 3.3 | 3.6 | 6.4 | 7.0 | Slightly soft |
| 3 | 4.4 | 4.5 | 6.6 | 6.0 | Brown, meatloaf color |
| 4 | 2.9 | 2.6 | 3.9 | 6.1 | Very gummy to feel, sticky |
| 5 | 6.6 | 6.8 | 5.5 | 4.3 | Dry texture, bad off-flavor, very white mottled color |
| 6 | 4.6 | 4.7 | 6.3 | 4.1 | Bad soy off-flavor |
| 7 | 3.1 | 3.1 | 4.3 | 5.8 | Somewhat sticky to feel, off-flavor |
| 8 | 4.1 | 4.4 | 5.4 | 4.9 | Off-flavor, whitish light color |
| 9 | 3.3 | 5.2 | 5.2 | 5.9 | Slight off-color (whitish), Some off-flavor |

Table 10-A

| | Series B - Formulation Variations | | | | | | |
|---|---|---|---|---|---|---|---|
| Sample | Modified Corn Starch | Egg Albumin | Soy Isolate | Water Addition 1st | 2nd | Total Water | Total Ingredients Including Meat |
| 1 (control) | 43.03 | 18.97 | 17.78 | 170.1 | 198.45 | 368.55 | 951.8 |

Table 10-A-continued

| | Series B - Formulation Variations | | | | | | |
|---|---|---|---|---|---|---|---|
| Sample | Modified Corn Starch | Egg Albumin | Soy Isolate | Water Addition 1st | 2nd | Total Water | Total Ingredients Including Meat |
| 2 | 43.03 | 18.97 | 17.78 | 170.1 | 198.45 | 368.55 | 951.8 |
| 3 | 43.03 | 18.97 | 17.78 | 170.1 | 198.45 | 368.55 | 951.8 |
| 4 | 93.63 | — | — | 170.1 | 186.6 | 356.7 | 951.8 |
| 5 | — | 93.63 | — | 170.1 | 186.6 | 356.7 | 951.8 |
| 6 | — | — | 56.21 | 170.1 | 224.03 | 394.13 | 951.8 |
| 7 | 55.46 | — | 22.92 | 170.1 | 201.89 | 371.99 | 951.8 |
| 8 | — | 36.55 | 34.26 | 170.1 | 209.4 | 379.5 | 951.8 |
| 9 | 64.98 | 28.65 | — | 170.1 | 186.61 | 356.71 | 951.8 |

Table 10-B

| | Series B - Results | | | | |
|---|---|---|---|---|---|
| Sample | Initial Bite | Chewability | Mouthfeel | Flavor | Other Comments |
| 1 (control) | 4.0 | 4.0 | 7.0 | 7.0 | |
| 2 | 3.7 | 3.6 | 6.7 | 6.8 | Slightly soft |
| 3 | 4.3 | 3.8 | 6.6 | 6.4 | Brown, meatloaf color |
| 4 | 2.8 | 2.6 | 4.0 | 6.0 | Very gummy to feel, sticky |
| 5 | 6.8 | 6.8 | 5.3 | 4.8 | Dry texture, off-flavor, very white mottled color |
| 6 | 5.0 | 5.1 | 6.2 | 5.1 | Soy off-flavor, slightly crumbly texture |
| 7 | 2.9 | 3.1 | 4.8 | 5.7 | Off-flavor, sticky to feel |
| 8 | 5.4 | 4.8 | 5.3 | 5.4 | Slightly dry, off-flavor, whitish light color |
| 9 | 4.3 | 4.1 | 5.8 | 6.1 | Slightly whitish color, slightly sticky to feel |

Table 11-A

| | Series C - Formulation Variations | | | | | | |
|---|---|---|---|---|---|---|---|
| Sample | Modified Corn Starch | Egg Albumin | Soy Isolate | Water Addition 1st | 2nd | Total Water | Total Ingredients Including Meat |
| 1 (control) | 43.03 | 18.97 | 17.78 | 170.1 | 198.45 | 368.55 | 951.8 |
| 2 | 43.03 | 18.97 | 17.78 | 170.1 | 198.45 | 368.55 | 951.8 |
| 3 | 43.03 | 18.97 | 17.78 | 170.1 | 198.45 | 368.55 | 951.8 |
| 4 | 79.78 | — | — | 170.1 | 198.45 | 368.55 | 951.8 |
| 5 | — | 79.78 | — | 170.1 | 198.45 | 368.55 | 951.8 |
| 6 | — | — | 79.78 | 170.1 | 198.45 | 368.55 | 951.8 |
| 7 | 56.45 | — | 23.33 | 170.1 | 198.45 | 368.55 | 951.8 |
| 8 | — | 41.18 | 38.60 | 170.1 | 198.45 | 368.55 | 951.8 |
| 9 | 55.37 | 24.41 | — | 170.1 | 198.45 | 368.55 | 951.8 |

Table 11-B

| | Series C - Results | | | | |
|---|---|---|---|---|---|
| Sample | Initial Bite | Chewability | Mouthfeel | Flavor | Other Comments |
| 1 (control) | 4.0 | 4.0 | 7.0 | 7.0 | |
| 2 | 3.7 | 3.4 | 6.7 | 6.9 | Slightly soft |
| 3 | 4.4 | 4.1 | 6.5 | 6.3 | Brown, meatloaf color |
| 4 | 2.7 | 2.4 | 4.6 | 6.4 | Very gummy to feel, sticky |
| 5 | 6.8 | 6.6 | 6.3 | 5.0 | Dry texture, off-flavor, very white mottled color |
| 6 | 4.9 | 4.8 | 6.6 | 5.3 | Off-flavor |
| 7 | 3.2 | 3.2 | 4.9 | 5.9 | Off-flavor, sticky to feel |
| 8 | 6.0 | 5.8 | 5.9 | 5.1 | Dry, off-flavor, whitish color |
| 9 | 3.7 | 3.4 | 5.8 | 6.6 | Slight whitish color |

In addition to the results reported in the Tables, the following observations on processing ease were made (apply to all of the samples):

| Sample | |
|---|---|
| 1 (control) | Easily mixed |
| 2 | More difficult to mix than control |
| 3 | Easily mixed, meat stayed red prior to cooking |
| 4 | Easily mixed |
| 5 | Easily mixed, but egg albumin tends to lump and difficult to mix in, bright dark color |
| 6 | Very difficult to mix, stiff and pasty, high cooking loss, product shrinks |
| 7 | Slightly more difficult to mix than control |
| 8 | Sligthly more difficult to mix than control, some cooking loss |
| 9 | Slightly easier to mix than control |

EXAMPLE VIII

Further preferred dry mix formulations are as follows:

| Bologna Flavor | |
|---|---|
| Ingredient | % |
| Tapioca starch | 34.014 |
| Sodium chloride[1] | 18.182 |
| Egg albumin | 15.000 |
| Soy isolate | 14.053 |
| Seasoning[2] | 11.636 |
| Sodium pyrophosphate[1] | 2.964 |

-continued

| Ingredient | % |
|---|---|
| Beef and pork flavors (natural) | 2.688 |
| Curing agent mixture[1] | 0.870 |
| Natural hickory smoke flavor | 0.395 |
| Sodium erythrobate[1] | 0.198 |
| | 100.000 |

[1]Preferably in separate package and added first to meat.
[2]Stange 61760 as used in Example III.

Salami Flavor

| Ingredient | % |
|---|---|
| Modified corn starch | 38.783 |
| Soy isolate | 20.877 |
| Egg albumin | 13.224 |
| Sodium chloride[1] | 10.604 |
| Sodium acid pyrophosphate | 4.117 |
| Beef and pork flavors (natural) | 3.817 |
| Seasoning (Stange 7305) | 3.743 |
| Sodium pyrophosphate[1] | 2.339 |
| Natural hickory smoke flavor | 1.560 |
| Curing agent mixture[1] | 0.686 |
| Sodium erythrobate[1] | 0.156 |
| Garlic powder | 0.094 |
| | 100.000 |

[1]Preferably in separate package and added first to meat.

Both of these formulations are capable of being used as in the previous Examples to obtain essentially two pounds of high quality luncheon meat type product from one pound of ground beef using readily available and common kitchen equipment and ovens.

The embodiments of the invention in which an exclusive property or privilege is claimed are defined as follows:

1. A dry mix composition for use in the preparation of cooked meat products of the nature of lunchmeat specialties consisting essentially of the identified ingredients in the following approximate %'s by weight:

| | % |
|---|---|
| (1) Starch or starch source material | 25 to 85 |
| (2) Protein component | 1.5 to 55 |
| (3) Meat curing agent | 0.10 to 3.0 |
| (4) Alkaline phosphate salt | 0.10 to 15.0 |
| (5) Sodium Chloride | 1.0 to 25.0 | wherein the protein component (2) is made up of egg albumin and a second protein in the weight ratio range of 48:1 to 1:48.

2. The dry mix composition of claim 1 which also contains a vegetable oil.

3. The dry mix composition of claim 1 which also contains an acidulent.

4. The dry mix composition of claim 1 which also contains flavorings, seasonings or coloring agents.

5. The dry mix composition of claim 1 wherein the ingredients are present in the following %'s by weight:

| | % |
|---|---|
| (1) Starch or starch source material | 30 to 70 |
| (2) Protein component | 10 to 35 |
| (3) Meat curing agent | 0.30 to 2.0 |
| (4) Alkaline phosphate salt | 0.40 to 6.0 |
| (5) Sodium chloride | 5.0 to 20.0 | wherein the weight ratio of the egg albumin to the second protein in (2) is in the range of 4:1 to 1:4.

6. The dry mix composition of claim 5 wherein ingredient (1) is modified corn starch.

7. The dry mix composition of claim 5 wherein ingredient (1) is tapioca starch.

8. The dry mix composition of claim 5 wherein the second protein in ingredient (2) is soy isolate.

9. The dry mix composition of claim 5 wherein the meat curing agent (3) is sodium nitrite.

10. The dry mix composition of claim 5 wherein the alkaline phosphate salt (4) is tetrasodium pyrophosphate.

11. The dry mix composition of claim 5 wherein ingredient (1) is modified corn starch, the second protein in ingredient (2) is soy isolate, the meat curing agent (3) is sodium nitrite and the alkaline phosphate salt (4) is tetrasodium pyrophosphate.

12. The dry mix composition of claim 11 which also contains 0 to 15.0% by weight of a vegetable oil, 0 to 10.0% by weight of an acidulent and 0 to 25.0% by weight of flavorings, seasonings and coloring agents.

13. The dry mix composition of claim 5 wherein the curing agent (3), the alkaline phosphate salt (4) and preferably the sodium chloride (5) are in a first package with the remaining ingredients being in a second package.

14. The process of preparing a cooked meat product of the nature of a lunchmeat specialty which comprises combining a dry mix with water and ground meat in a weight ratio of water to dry mix of about 1.5-4.0:1 and a weight ratio of the ground meat to the dry mix-water combination of about 1:0.25 to 1:2.5, mixing the composite combination until the same is essentially free from lumps and then cooking the mixture to yield the product, said dry mix consisting essentially of the identified ingredients in the following approximate %'s by weight:

| | % |
|---|---|
| (1) Starch or starch source material | 25 to 85 |
| (2) Protein component | 1.5 to 55 |
| (3) Meat curing agent | 0.10 to 3.0 |
| (4) Alkaline phosphate salt | 0.10 to 15.0 |
| (5) Sodium Chloride | 1.0 to 25.0 | wherein the protein component (2) is made up of egg albumin and a second protein in the weight ratio range of 48:1 to 1:48.

15. The process of claim 14 wherein the ground meat is ground beef.

16. The process of claim 14 wherein the ingredients of the dry mix are present therein in the following %'s by weight:

| | % |
|---|---|
| (1) Starch or starch source material | 30 to 70 |
| (2) Protein component | 10 to 35 |
| (3) Meat curing agent | 0.30 to 2.0 |
| (4) Alkaline phosphate salt | 0.40 to 6.0 |
| (5) Sodium chloride | 5.0 to 20.0 |

17. The process of claim 16 wherein ingredient (1) is modified corn starch, the second protein in ingredient (2) is soy isolate, the meat curing agent (3) is sodium nitrite and the alkaline phosphate salt (4) is tetrasodium pyrophosphate.

18. The process of preparing a cooked meat product of the nature of a lunchmeat specialty which comprises combining and mixing ground meat and water with a dry mix composition in two steps and cooking the resulting mixture to provide the product, said dry mix comprising about 30 to 70% by weight of starch or starch source material, about 10 to 35% by weight of a protein component wherein egg albumin and a second protein are present in a weight ratio of about 4:1 to 1:4, about 0.30 to 2.0% by weight of a meat curing agent, about 0.40 to 6.0% by weight of an alkaline phosphate salt and about 5.0 to 20.0% by weight of sodium chloride, said dry mix being used in two portions, the first of which comprises the curing agent, the alkaline phosphate salt and preferably the sodium chloride and the second portion comprises the remaining ingredients, said water and dry mix being used in a weight ratio of about 1.5–4.0:1 with a portion of the water being added in the first mixing step with the first portion of the dry mix and the remainder of the water being added in the second mixing step along with the second portion of the dry mix and said ground meat to dry mixwater combination weight ratio being in the range of 1:0.25 to 1:2.5 with all of the ground meat being added in the first mixing step.

* * * * *

UNITED STATES PATENT AND TRADEMARK OFFICE
CERTIFICATE OF CORRECTION

PATENT NO. : 4,071,635
DATED : January 31, 1978
INVENTOR(S) : Willibald M. Lindl, James R. Klande, Glenn J. VanHull It is certified that error appears in the above-identified patent and that said Letters Patent are hereby corrected as shown below:

Column 2, Line 4: "cooking" should be -- cooked --
          Line 26: "bits" should be -- bite --
          Line 68: "nitrile" should be -- nitrite --.

Column 3, Line 4: "nitrile" should be -- nitrite --.

Column 4, Line 13: "pacakge" should be -- package --.

Column 8, Line 6: "Table 3" should be -- Table 5 --.

Table 9-A: the work Modified should be centered over Corn Starch as the heading of the 2nd column in table.

Column 13, Line 13: 4.117 should be in the percentage column rather than after Sodium acid pyrophosphate Signed and Sealed this Eleventh Day of July 1978

[SEAL]

Attest:

RUTH C. MASON
Attesting Officer

DONALD W. BANNER
Commissioner of Patents and Trademarks